United States Patent
Kim et al.

(10) Patent No.: US 8,078,744 B2
(45) Date of Patent: Dec. 13, 2011

(54) COMMUNICATION METHOD AND APPARATUS USING HYPERTEXT TRANSFER PROTOCOL

(75) Inventors: Yoon-soo Kim, Suwon-si (KR); Joon-ho Cho, Suwon-si (KR); Sang-hoon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 11/967,289

(22) Filed: Dec. 31, 2007

(65) Prior Publication Data

US 2008/0256254 A1 Oct. 16, 2008

(30) Foreign Application Priority Data

Apr. 16, 2007 (KR) .................. 10-2007-0037151

(51) Int. Cl.
*G06F 15/16* (2006.01)

(52) U.S. Cl. ...................... 709/230; 709/231

(58) Field of Classification Search ........... 709/227–231
See application file for complete search history.

(56) References Cited

U.S. PATENT DOCUMENTS

| | | | | |
|---|---|---|---|---|
| 6,122,668 | A * | 9/2000 | Teng et al. ................. | 709/231 |
| 7,206,932 | B1 * | 4/2007 | Kirchhoff ................... | 713/152 |
| 7,209,972 | B1 * | 4/2007 | Ignatius et al. ............. | 709/231 |
| 7,587,509 | B1 * | 9/2009 | Edelman et al. ............ | 709/231 |
| 2005/0120132 | A1 | 6/2005 | Hutter ....................... | 709/234 |
| 2007/0003251 | A1 * | 1/2007 | Chung et al. ................ | 386/96 |
| 2007/0168542 | A1 * | 7/2007 | Gupta et al. ................. | 709/231 |
| 2008/0133766 | A1 * | 6/2008 | Luo ............................ | 709/231 |

\* cited by examiner

*Primary Examiner* — Hussein A. Elchanti
(74) *Attorney, Agent, or Firm* — Sughrue Mion, PLLC

(57) ABSTRACT

A communication method for implementing a real-time streaming using hypertext transfer protocol (HTTP) in a network is provided. Chunked encoding of HTTP is applied so that information can be exchanged between a server and a client while an HTTP request is being progressed. Therefore, bidirectional communication between the client and the server using HTTP is possible without modifying an existing HTTP protocol, and real-time transmission can be implemented.

11 Claims, 12 Drawing Sheets

COMMUNICATION METHOD AND APPARATUS USING HYPERTEXT TRANSFER PROTOCOL

CROSS-REFERENCE TO RELATED PATENT APPLICATION

This application claims priority from Korean Patent Application No. 10-2007-0037151, filed on Apr. 16, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to communication using hypertext transfer protocol (HTTP), and more particularly, to implementing a real-time streaming using HTTP, and a client and a server used for the method.

2. Description of the Related Art

Streaming is transmission of video or audio from a server to a client through a network such as the Internet. The server breaks the video into packets so as to be transmitted through the network. The client collects the packets to recover the video and reproduces the video. Here, the reproduction and packet reception simultaneously occur. The packets associated here are referred to as streaming.

Streaming is distinguished from a simple file transmission for performing reproduction after receiving the entire video, in that the client reproduces video data while continuously receives the video data. The client simultaneously receives and reproduces streaming client packets and disuses the reproduced data. For streaming a file, protocols such as HTTP, file transfer protocol (FTP), real-time transport protocol (RTP), and real-time streaming protocol (RTSP) can be used. The HTTP and the FTP are inherently file transfer protocols, while the RTP and the RTSP are protocols for real-time file streaming.

FIG. 1 is a signal flow diagram for explaining real-time streaming using HTTP between a client and a server according to the related art.

Referring to FIG. 1, the client 100 and the server 110 cannot transceive information with each other while processing HTTP requests by using an existing HTTP protocol and cannot cope with a session state which continuously changes, so that the existing HTTP protocol is not suitable for real-time streaming.

A related art HTTP operates in that, as described above, an HTTP client always transmits a request, and an HTTP server transmits a response to the request. According to the aforementioned operation, when a state change in the HTTP server occurs, there is no method of notifying the change. In addition, there is no method of transmitting a request which is not a response from the HTTP server to the HTTP client. In addition, the HTTP client cannot receive a response to a new HTTP request from the HTTP server while processing a previous HTTP request. Lastly, when the HTTP response is divided into packets to be transmitted, there is no method of performing timestamping on each of the packets. Due to the restrictions, the HTTP has disadvantages for supporting real-time transport.

As a related art protocol supporting the real-time transport, there is the RTP. However, recently, for universal plug and play (UPnP) audio and video (AV)/digital living network alliance (DLNA), the HTTP is designated as a basic streaming protocol due to simplicity and convenience of the HTTP.

In this case, it is necessary to enable real-time transport to be performed by only extending the HTTP. In addition, it is also important to enable the real-time transport to be performed by at least modifying an existing code.

A format of chunked encoding of HTTP 1.1 is shown by a Backus Naur Form (BNF) as follows.

```
Chunked-Body = *chunk last-chunk trailer CRLF
chunk = chunk-size [ chunk-extension ] CRLF chunk-data CRLF
chunk-size = 1*HEX
last-chunk = 1*("0") [ chunk-extension ] CRLF
chunk-extension= *( ";" chunk-ext-name [ "=" chunk-ext-val ] )
chunk-ext-name = token
chunk-ext-val = token | quoted-string
chunk-data = chunk-size(OCTET)
trailer = *(entity-header CRLF)
```

Where, * means that the following part is repeated by the number in front of the *, token means string represented by general American Standard Code for Information Interchange (ASCII) codes, and HEX means hexadecimal. A part included in '[', ']' can be omitted, and contents of a part included in '(',')' are managed as one. CRLF represents '\r' and '\n'.

The BNF is interpreted according to this rule in that, Chunked-Body represents that 0 or more chunk is repeated and when "last-chunk trailer CRLF" is shown, the Chunked-Body is completed. Here, the chunk includes "chunk-size chunk-extension CRLF chunk-data CRLF", and "chunk-extension" can be omitted. Chunk-size means a magnitude represented as hexadecimal, "chunk-extension" has a repeated pair of a name and a value as shown as chunk-ext-name=chunk-ext-val", and has a format having ';' for division. Last-chunk includes one or more fields constructed with "0", and chunk-extension and CRLF that can be omitted. Trailer includes 0 or more entity-header, for example a HTTP header. An example of the above chunk-body format is as follows.

```
1: 100;cen1=cev1;cen2=cev2;cen3\r\n
2: 100 bytes of chunk-data...\r\n
3: 200\r\n
4: 200 bytes of chunk-data...\r\n
5: 0\r\n
6: HTTP-Header: HTTP-Header-Value\r\n
7: \r\n
```

In the chunk-body example, front numbers and ':' represent line numbers. At the first line, "100" means that the size of following chunk-data is "100 bytes", and "cen1= . . . cen3" is "chunk-extension". Completion of chunk header information is represented as \r\n. In addition, at the second line, the chunk-data is transmitted, and at the end of the chunk-data, the \r\n is transmitted. At the third line, \r\n follows "200". This exemplifies a case where "chunk-extension" is omitted. At the fourth line, similar to the line 2, real chunk-data is transmitted. At the fifth line which is the last chunk, after "0" is transmitted, \r\n is transmitted. After the last chunk, as shown at the sixth line, "trailer" including entity-header is transmitted. Lastly, as shown at the seventh line, \r\n is transmitted. An example of a complete HTTP response transmitting chunk-body as described above is as follows.

```
01: HTTP/1.1 200 OK\r\n
02: Transfer-Encoding: chunked\r\n
03: \r\n
04: 100;cen1=cev1;cen2=cev2;cen3\r\n
05: 100 bytes of chunk-data...\r\n
06: 200\r\n
07: 200 bytes of chunk-data...\r\n
08: 0\r\n
09: HTTP-Header: HTTP-Header-Value\r\n
10: \r\n
```

The second line shows that the HTTP server transmits data via chunked encoding through an HTTP header referred to as "Transfer-Encoding: chunked".

SUMMARY OF THE INVENTION

The present invention provides a method of exchanging information between a streaming server and a client by using chunked encoding of HTTP while an HTTP request is being processed.

The present invention also provides a method of notifying an HTTP server state change, a method of exchanging information between a client and a server while an HTTP request is being processed, and a method of timestamping on an individual HTTP response packet.

The present invention also provides a client and a server for implementing a communication method using HTTP.

According to an aspect of the present invention, there is provided a communication method using HTTP, including: setting streaming connection and control connection between a client and a server; the client transmitting an HTTP streaming request to the server; the server constructing a chunked encoding for the HTTP streaming request, and transmitting a first chunk response, including the chunked encoding, to the client through the streaming connection; and the server transmitting a second chunk response to the client through the streaming connection, wherein the second chunk response includes notification of the server.

According to another aspect of the present invention, there is provided a communication method using HTTP, including: a control handler receiving session information from a session manager, converting the session information into a chunk-extension message, and transmitting the chunk-extension message to an HTTP scheduler; the HTTP scheduler checking whether chunk transmission to an HTTP client is being performed, and when the chunk transmission is being performed, buffering the chunk-extension message until the next chunk is transmitted; the HTTP scheduler generating chunk data, by multiplexing multimedia content received from a streaming server and the chunk-extension message, and transmitting the chunk data to an HTTP server; and the HTTP server transmitting the chunk data to the HTTP client through streaming connection.

According to another aspect of the present invention, there is provided a communication method using HTTP, including: an HTTP client receiving chunk data from an HTTP server through streaming connection and transmitting the chunk data to an HTTP dispatcher, wherein the chunk data is obtained by multiplexing multimedia content and a chunk-extension message; an HTTP dispatcher demultiplexing the chunk data into the multimedia content and the chunk-extension message, transmitting the chunk-extension message to a control handler, and transmitting the multimedia content to a streaming client; and the control handler converting the chunk-extension message into session information and transmitting the session information to a session synthesizer.

According to another aspect of the present invention, there is provided a communication method using HTTP, including: a control handler receiving a session control request from a session synthesizer, converting the session control request into an HTTP control request, and transmitting the HTTP control request to an HTTP dispatcher; the HTTP dispatcher constructing an HTTP request by adding an HTTP header to the HTTP control request and transmitting the HTTP request to an HTTP client which manages control connection; and the HTTP client transmitting the HTTP request to an HTTP server through the control connection.

According to another aspect of the present invention, there is provided a communication method using HTTP, including: an HTTP server receiving an HTTP request from an HTTP client through control connection and transmitting the HTTP request to an HTTP scheduler; the HTTP scheduler analyzing the HTTP request, and based on the result of the analysis, extracting a control request excluding an HTTP header from the HTTP request, and transmitting the control request to a control handler; and the control handler converting the control request to a session control message and retrieving and calling callback, of a session manager, corresponding to the session control message.

According to another aspect of the present invention, there is provided a communication method using HTTP, including: a control handler of a client receiving a session control response from a session synthesizer, converting the session control response into an HTTP message, and transmitting the HTTP message to an HTTP dispatcher; the HTTP dispatcher generating an HTTP request by adding an HTTP header to the HTTP message, selecting an HTTP client which manages control connection, and transmitting the HTTP request to the HTTP client; the HTTP client transmitting the HTTP request through the control connection to an HTTP server, and the HTTP server transmitting the HTTP request to an HTTP scheduler; and the HTTP scheduler analyzing the HTTP request, and based on the result of the analysis, extracting the session control response from the HTTP request, and transmitting the extracted session control response to a control handler of a server.

According to another aspect of the present invention, there is provided a communication apparatus using HTTP, including: a client which is connected with a server through a streaming connection and a control connection; wherein the client requests an HTTP streaming request through the streaming connection; wherein the client transmits an HTTP post request to the server through the control connection; wherein the HTTP post request includes a control request and a response to a query of a state of the client from the server to the client.

According to another aspect of the present invention, there is provided a communication apparatus using HTTP, including: a server which is connected with a client through a streaming connection and a control connection; wherein the server receives an HTTP streaming request from the client through the streaming connection; wherein the server constructs chunked encoding for the HTTP streaming request and transmits a first chunk response, including the chunked encoding, to the client through the streaming connection; wherein the server transmits a second chunk response to the client through the streaming connection; wherein the second chunk response includes a notification of the server.

According to another aspect of the present invention, there is provided a computer readable recording medium having recorded thereon a program for executing the methods described above.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the attached drawings.

Figure 1:
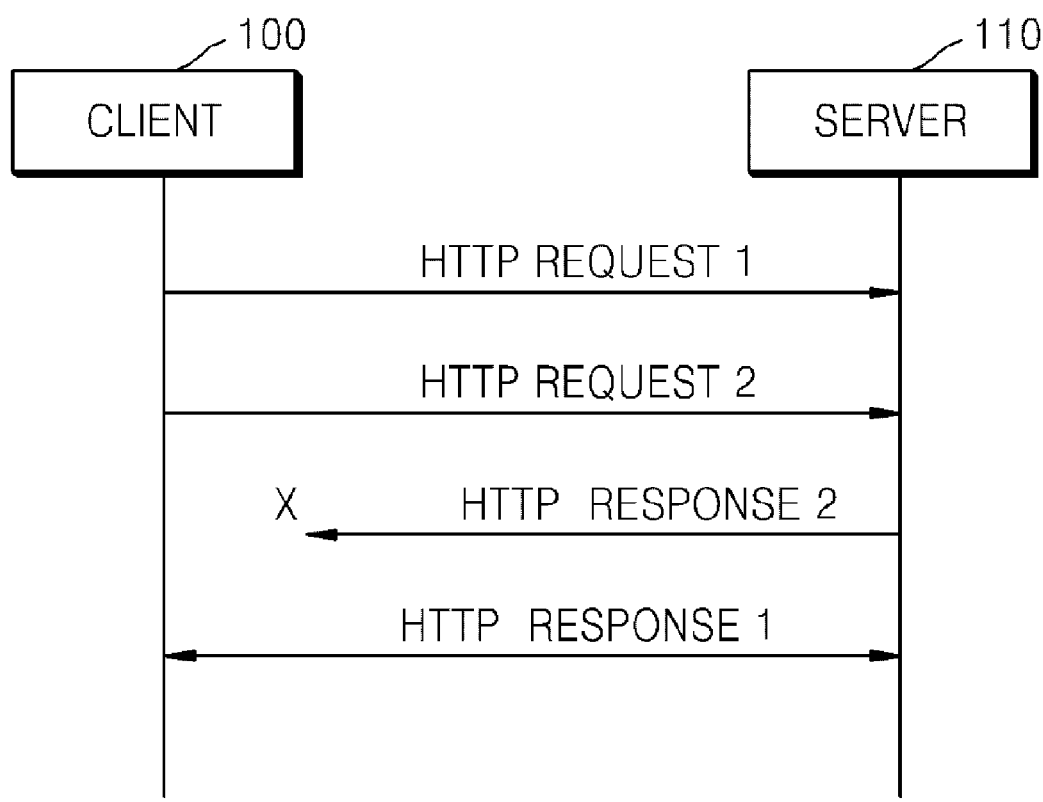
FIG. 1 is a signal flow diagram for explaining real-time streaming using HTTP between a client and a server according to the related art.
Figure 2:
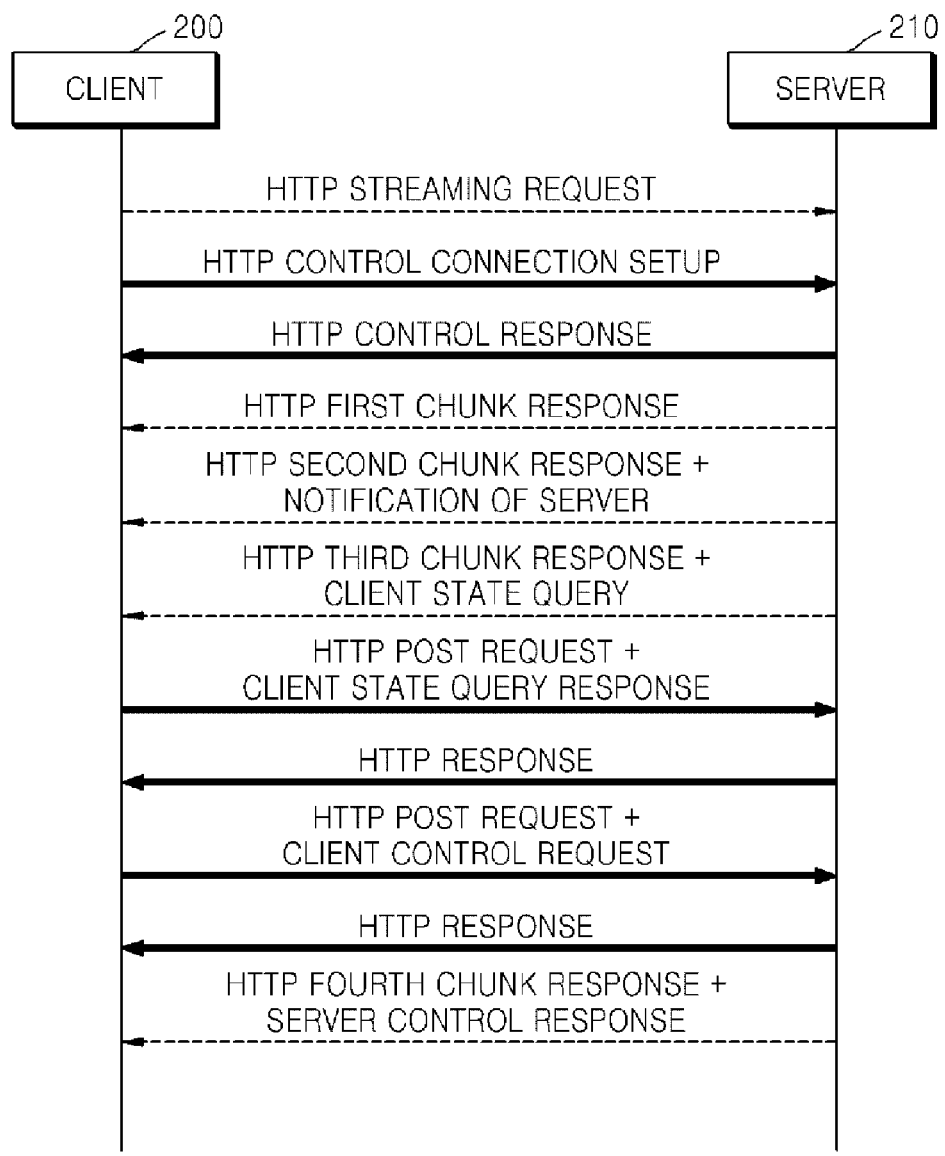
FIG. 2 is a signal flow diagram for explaining real-time streaming using HTTP between a client and a server according to an exemplary embodiment of the present invention.

FIG. 2 is a signal flow diagram for explaining real-time streaming using HTTP between a client and a server according to an exemplary embodiment of the present invention;

Referring to FIG. 2, thick lines represent control connection between a client 200 and a server 210, and dotted lines represent streaming connection between the client 200 and the server 210.

The client 200 firstly has the streaming connection with the server 210 when transmits a streaming request. In addition, the client 200 sets the control connection independent from the streaming connection.

The server 210 transmits a query request for a state of the client 200 by using a new chunk of chunked encoding of HTTP 1.1 through the streaming connection or informs the client 200 of a change in streaming data.

The client 200 may transmit a new request to the server 210 or transmit a response to the request of the server 210 through the control connection while HTTP streaming is performed through the streaming connection.

Here, in order for the client 200 and the server 210 to refer to a specific streaming session while transceiving requests with each other, session identification (ID) information is added to request and response messages. In addition, a sequence number for command and notification is added. Here, the sequence number is only one in a single session.

The server 210 constructs a chunk in order to transmit real streaming data, and starts a new chunk whenever transmits notification messages or query messages to the client 200 right after currently progressed chunk is completed and whenever transmits a response message to a control request of the client 200. The server 210 performs timestamping on each chunk by using chunk-extension when transmits each of the chunks.

As shown in FIG. 2, the server 210 transmits an HTTP chunk response which is divided into an HTTP first chunk response, an HTTP second chunk response, an HTTP third chunk response, and an HTTP fourth chunk response through the streaming connection while adding a notification, a client state query, and server control response message to the chunk-extension. The client 200 adds a client state query response message and a client control request message to HTTP post requests, respectively, and transmits them through the control connection.

Figure 3:
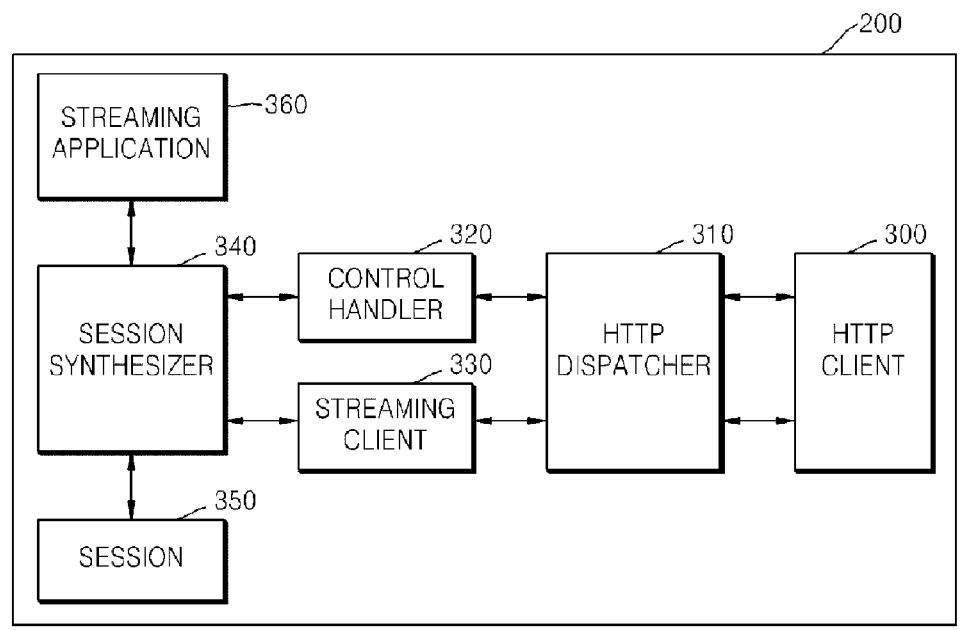
FIG. 3 is a block diagram showing a schematic structure of the client shown in FIG. 2.

FIG. 3 is a block diagram showing a schematic structure of the client 200 shown in FIG. 2.

Referring to FIG. 3, an HTTP client 300, an HTTP dispatcher 310, a control handler 320, a streaming client 330, a session synthesizer 340, a session 350, and a streaming application 360 are shown.

The HTTP client 330 is a module for processing logic of a client of the HTTP 1.1 protocol.

The HTTP dispatcher 310 is a module for separating a control request of a server from the server to a client, notification from the server to the client, and a response from the server to the client to a control request from the client to the server, from each of chunk data so as to be transmitted to the control handler 320.

More specifically, the HTTP dispatcher 310 transmits a timestamp of each individual chunk transmitted from the HTTP client 300 to the control handler 320, and obtains multimedia data needed for streaming from each chunk to transmit the obtained multimedia to the streaming client 330. In addition, the HTTP dispatcher 310 transmits a stream control request from the client to the server of the control handler 320 to the server through the control connection and processes timeout of an individual stream control request. In addition, the HTTP dispatcher 310 transmits a response to the control request from the server to the client of the control handler 320, to the server through the control connection.

The control handler 320 converts a control instruction in a streaming level to a control instruction in an HTTP level, receives a response of a server to the control instruction from the HTTP dispatcher 310, and converts the received response into a format understandable by the session synthesizer 340 so as to be transmitted to the session synthesizer 340.

More specifically, the control handler 320 receives notification from the server to the client of the server, from the HTTP dispatcher 310 and converts the notification into a format understandable by the session synthesizer 340 so as to notify the session synthesizer 340. In addition, the control handler 320 calls callback registered by the session synthesizer 340 for the control request of the server from the server to the client and converts a response to this in the streaming session level to a response in the HTTP level.

The streaming client 330 receives chunk-data from the HTTP dispatcher 310 and performs buffering thereon and provides data to the streaming application 360. In addition, the streaming client 330 provides a reception state, a reception time, a timestamp time, and buffer statistics information of each chunk to the session synthesizer 340. In addition, the streaming client 330 adjusts the number of buffers according to an instruction of the session synthesizer 340.

The session synthesizer 340 is a module for synthesizing streaming sessions and performing a control function. Specifically, the session synthesizer 340 performs control in a session level by using the control handler 320, and controls the streaming client 330 in correspondence with a change in streaming data notified from the control handler 320. In addition, the session synthesizer 340 responds to session control from the server to the client, requested by the control handler 320. In addition, the session synthesizer 340 monitors a streaming state by using the streaming client 330 and has a function of connecting a buffer of the streaming client 330 to the streaming application 360.

The streaming application 360 is a module for real rendering multimedia contents by using the session synthesizer 340.

Figure 4:
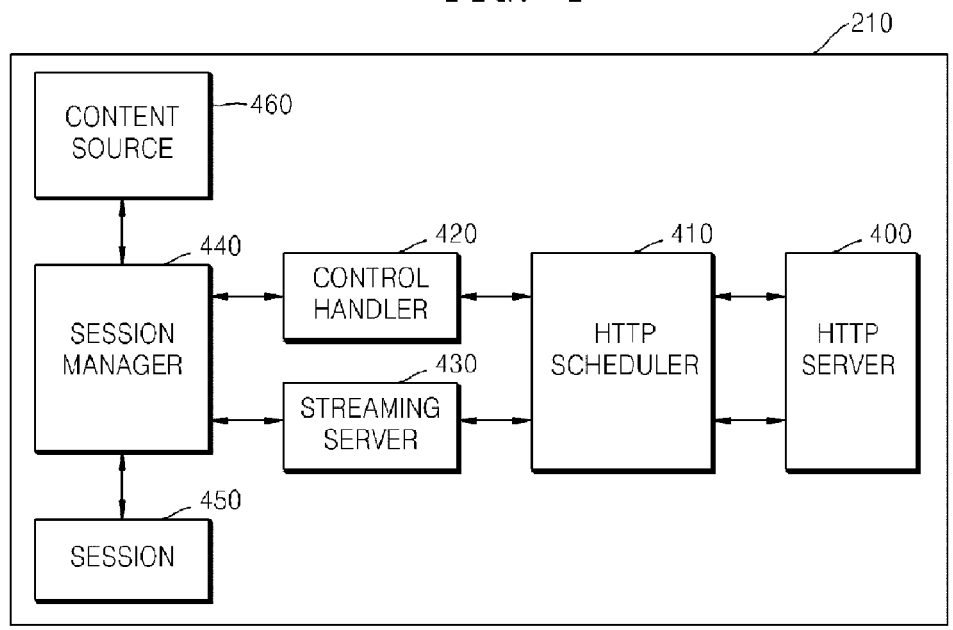
FIG. 4 is a block diagram showing a schematic structure of the server shown in FIG. 2.

FIG. 4 is a block diagram showing a schematic structure of the server 210 shown in FIG. 2.

Referring to FIG. 4, an HTTP server 400, an HTTP scheduler 410, a control handler 420, a streaming server 430, a session manager 440, a session 450, and a content source 460 are shown.

The HTTP server 400 is a module for processing logic of a server of the HTTP 1.1 protocol.

The HTTP scheduler 410 performs the following functions. When the HTTP scheduler 410 receives a notification request of a change in the streaming data from the server to the client from the control handler 420, the HTTP scheduler 410 performs buffering thereon, and at a time point when current transmission of chunk data is completed and a new chunk is transmitted, the HTTP scheduler 410 transmits a corresponding notification to the new chunk. In addition, when the HTTP scheduler 410 receives a control request from the server to the client, from the control handler 420, at the time point when current transmission of chunk data is completed and a new chunk is transmitted, the HTTP scheduler 410 inserts the corresponding control request to the new chunk so as to be transmitted. In addition, the HTTP scheduler 410 performs buffering on the response to the control request from the client to the server, wherein the request is received from the control handler 420. When the current transmission of chunk data is completed and a new chunk is transmitted, a response to the corresponding control request to the chunk is inserted. In addition, the HTTP scheduler 410 inserts a timestamp to each individual chunk, and multiplexes chunk header information, a notification message according to the current exemplary embodiment of the present invention, a control request message, meta information on a control request response message or a timestamp, and a chunk data such as multimedia data.

In addition, when the HTTP scheduler 410 receives a control request from the client to the server through the control connection, the HTTP scheduler 410 transmits an acknowledgment (ACK) (HTTP/1.1 200 OK) in response thereto, and when receiving a response of the client to the control request from the server to the client, transmits ACK (HTTP/1.1 200 OK) in response thereto.

The control handler 420 converts notification from the server to the client in the streaming session level to notification in a chunk-extension level and transmits the converted notification to the HTTP scheduler 410. In addition, when there is a request from the server to the client in the streaming session level, the control handler 420 converts the request into a control instruction in the chunk-extension level, transmits the control instruction to the HTTP scheduler 410, and processes timeout for the request.

In addition, when the control handler 420 receives a control request of the client from the client to the server through the control connection, the control handler 420 calls callback registered by the session manager 440, converts a response to this in the streaming session level into the chunk-extension level, and transmits the converted response to the HTTP scheduler 410.

The streaming server 430 reads real streaming data from the content source 460 to perform buffering thereon so as to be transmitted to the HTTP scheduler 410. The streaming server 430 has a function of transmission while maintaining timing of each chunk data for streaming. In addition, the streaming server 430 divides the chunk into data needed for a unit time so as to be transmitted. In addition, the streaming server 430 has a function of adjusting the number of internal transfer buffers according to a request from the session manager 440.

The session manager 440 is a module for synthesizing streaming sessions to perform a control function, and more particularly, perform the following functions. The session manager 440 performs control in a session level by using the control handler 420. In addition, the session manager 440 monitors states of the client and the network by using the control handler 420, monitors a state of the server by using the streaming server 430, and controls the streaming server 430.

The content source 460 is a module for providing contents to be steamed by the streaming server 430.

Figure 5:
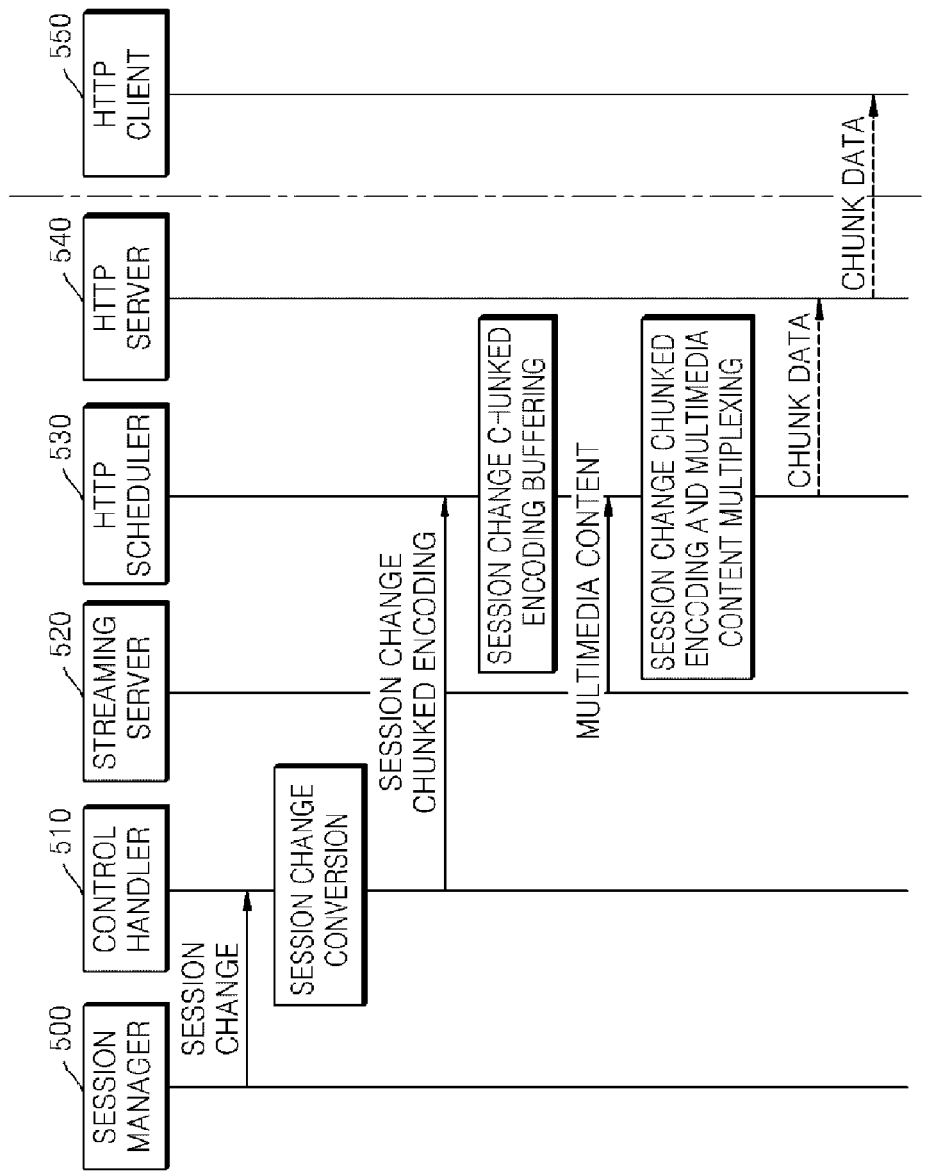
FIG. 5 is a signal flow diagram of a server for transmitting notification from the server to a client according to another exemplary embodiment of the present invention.

FIG. 5 is a signal flow diagram of a server for transmitting notification from the server to a client according to another exemplary embodiment of the present invention.

In FIG. 5, the left of a chain line represents the server, and the right of the chain line represents the client. In addition, dotted lines represent the streaming connection.

Firstly, a session manager 500 transmits a session change to the control handler 510. In this case, the session manager 500 monitors a change in a session state and transmits the change as a notification message. The control handler 510 receives the notification and converts the session change. Specifically, the control handler 510 converts a session change message in a session level into a message in a chunk-extension level. Here, a sessionid is added to a message ID.

Next, the control handler transmits the converted session change chunked encoding to an HTTP scheduler 530. The HTTP scheduler 530 performs buffering on the session change chunked encoding. Here, the HTTP scheduler 530 checks whether chunk transmission is currently being performed. When the chunk transmission is being performed, the HTTP scheduler 530 does not immediately transmit the session change chunked encoding and performs buffering until a next chunk is transmitted. The streaming server 520 transmits multimedia data to the HTTP scheduler 530 to request the HTTP scheduler 530 to transmit the multimedia data to the client. Thereafter, the HTTP scheduler 530 multiplexes the session change chunk encoding received from the control handler 510 and the multimedia data received from the streaming server 520. More specifically, the HTTP scheduler 530 multiplexes session change notification messages currently piled in a buffer, a session control request message from the server to the client, a response message to a control request from the client to the server, and the multimedia content data, into chunk data messages.

Next, the HTTP scheduler 530 transmits the multiplexed chunk data to the HTTP server 540 through the streaming connection, and the HTTP server 540 transmits the multiplexed chunk data to the HTTP client 550. Here, a message format of the chunk data may be constructed as follows.

```
chunk-size;timestamp=1234567.0234;type=multiple;number of
msgs;start;type=sessionchange;cmd=sessionchange;\sessionid=
1234567;sequence=100;bitrate=1.2Mbps;channels=7.1;containerformat=
MP3;encoding=MP3;end;\r\n AV content-data......\r\n
```

The message format is an example of a chunk data message format for notification from the server to the client.

Here, "timestamp" represents a time at which a current chunk is transmitted. "Type=multiple" represents that several messages are multiplexed into one chunk. Next, "number of msgs" represents the number of messages of the server, which are multiplexed into the current chunk. "Start" and "end" represent start and end of each individual message. Each individual message always includes "type", "cmd", "sessionid", "sequence", and the like, and remaining fields have different contents according to a type of each message. As described above, the message transmitted from the server is defined to include several messages because a requested session change, a session control request from the server to the client, and a session control response message from the client to the server cannot be transmitted while the current chunk is being transmitted. Therefore, the aforementioned messages are buffered, and when a next chunk is started to be transmitted, the messages buffered until then are multiplexed into chunk data. This message format may be commonly applied to the session change from the server to the client, the session control request from the server to the client, and the session control response from the client to the server.

Figure 6:
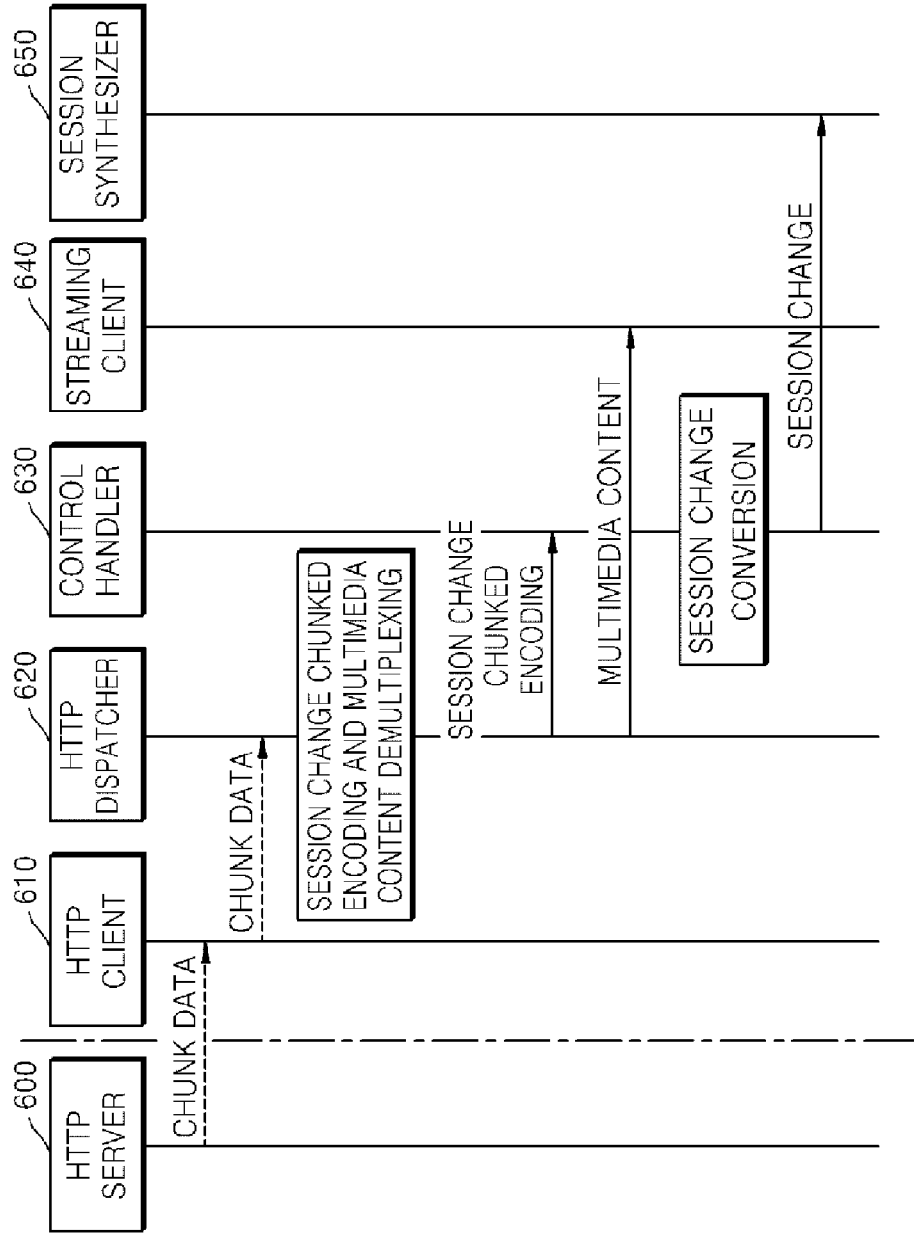
FIG. 6 is a signal flow diagram of a client for receiving notification from a server to the client according to another exemplary embodiment of the present invention.

FIG. 6 is a signal flow diagram of a client for receiving notification from a server to the client according to another exemplary embodiment of the present invention.

Similar to FIG. 5, the left of a chain line represents the server, and the right of the chain line represents the client. In addition, dotted lines represent streaming connection.

An HTTP client 610 receives chunk data from an HTTP server 600 through the streaming connection and transmits the chunk data to an HTTP dispatcher 620. Here, the chunk data is multiplexed session change information and multiplexed multimedia content data.

The HTTP dispatcher 620 demultiplexes session change chunked encoding and the multimedia contents. In other words, the HTTP dispatcher 620 divides the chunk data into session change information and multimedia content information. Next, the HTTP dispatcher 620 transmits the divided session change chunk-extension information to a control handler 630, and transmits the divided multimedia content data to a streaming client 640.

The control handler 630 converts the received session change chunked encoding information into a notification message in a session level in order to convert the received session change chunked encoding. Next, the control handler 630 transmits the converted session change notification message to a session synthesizer 650.

Figure 7:
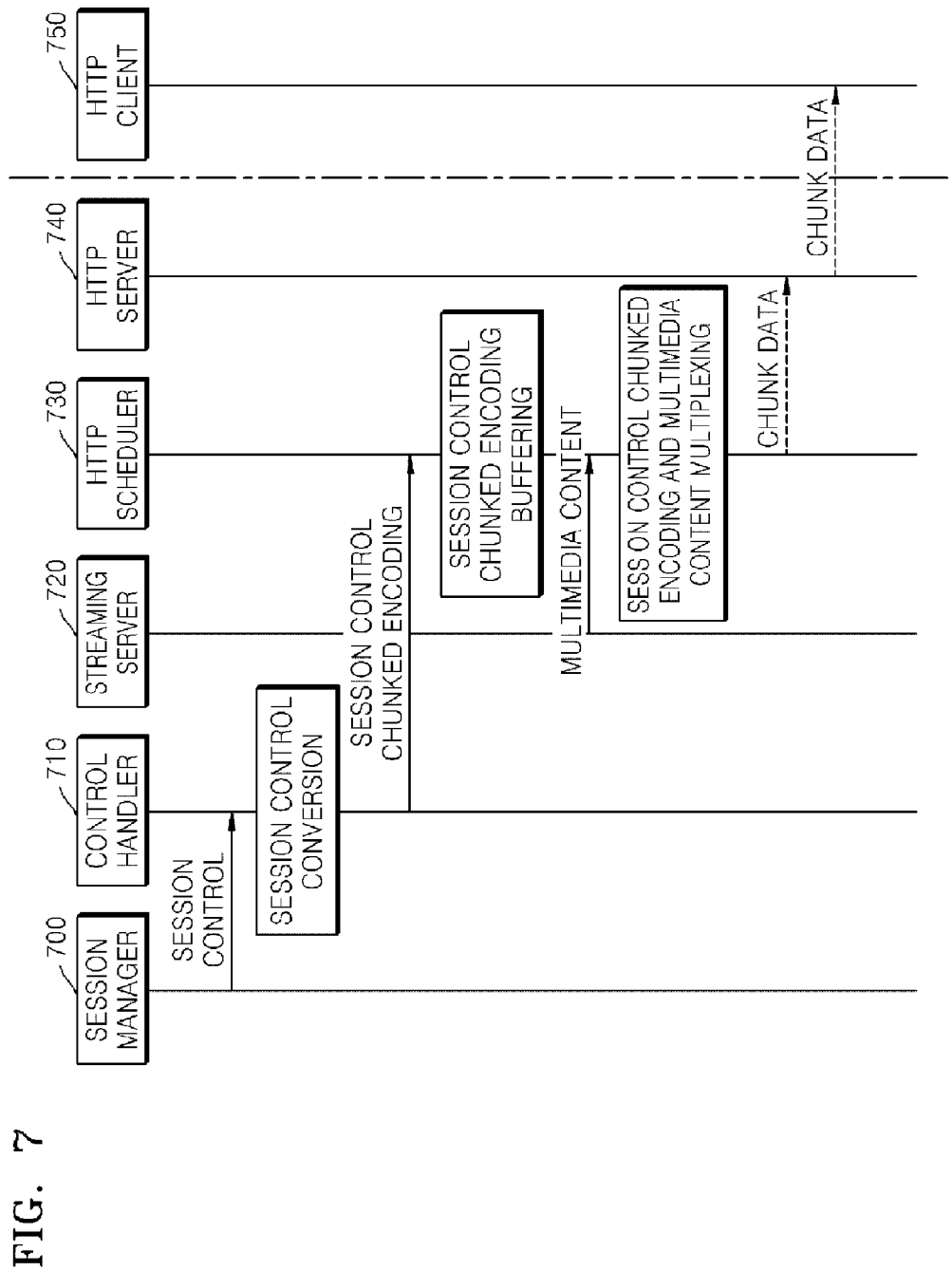
FIG. 7 is a signal flow diagram of a server for transmitting a control request from the server to a client according to another exemplary embodiment of the present invention.

FIG. 7 is a signal flow diagram of a server for transmitting a control request from the server to a client according to another exemplary embodiment of the present invention.

Similarly to in FIGS. 5 and 6, the left of a chain line represents the server, and the right of the chain line represents the client. In addition, dotted lines represent streaming connection.

A session manager 700 transmits a session control request to a control handler 710 when needs to control a session. The control handler 710 which receives the session control request converts session control. To do this, the control handler 710 converts a control message in a session level into a session control message in a chunk level. Next, the control handler 710 transmits the converted session control chunked encoding message in the chunk level to an HTTP scheduler 730. The HTTP scheduler 730 performs buffering on the session control chunked encoding. Here, the HTTP scheduler 730 checks whether current chunk transmission is being performed. When the current chunk transmission is being performed, the HTTP scheduler 730 does not immediately transmit the session control chunked encoding message and performs buffering until a next chunk is transmitted. A streaming server 720 transmits multimedia content data to the HTTP scheduler 730.

The HTTP scheduler 730 multiplexes the session control chunked encoding message and the multimedia contents. To do this, the HTTP scheduler 730 multiplexes session changes currently piled in a buffer, a session control request from the server to the client, a response message to the session control request from the client to the server, and the multimedia content data, into a chunk message. The HTTP scheduler 730 transmits the multiplexed chunk data to an HTTP server 740, and the HTTP server 740 transmits the chunk data to the HTTP client 750 through the streaming connection.

Here, a format of the chunk data message transmitted from the HTTP server 740 is similar to the message format described with reference to FIG. 5. However, the format of the chunk data message is different from the message format shown in FIG. 5 in that a type value of each individual message is "sessioncontrol", and "cmd" means a type of a control instruction. For example, other fields except for, "sessionstatusquery-sessionid" and a sequence field may be different.

Figure 8:
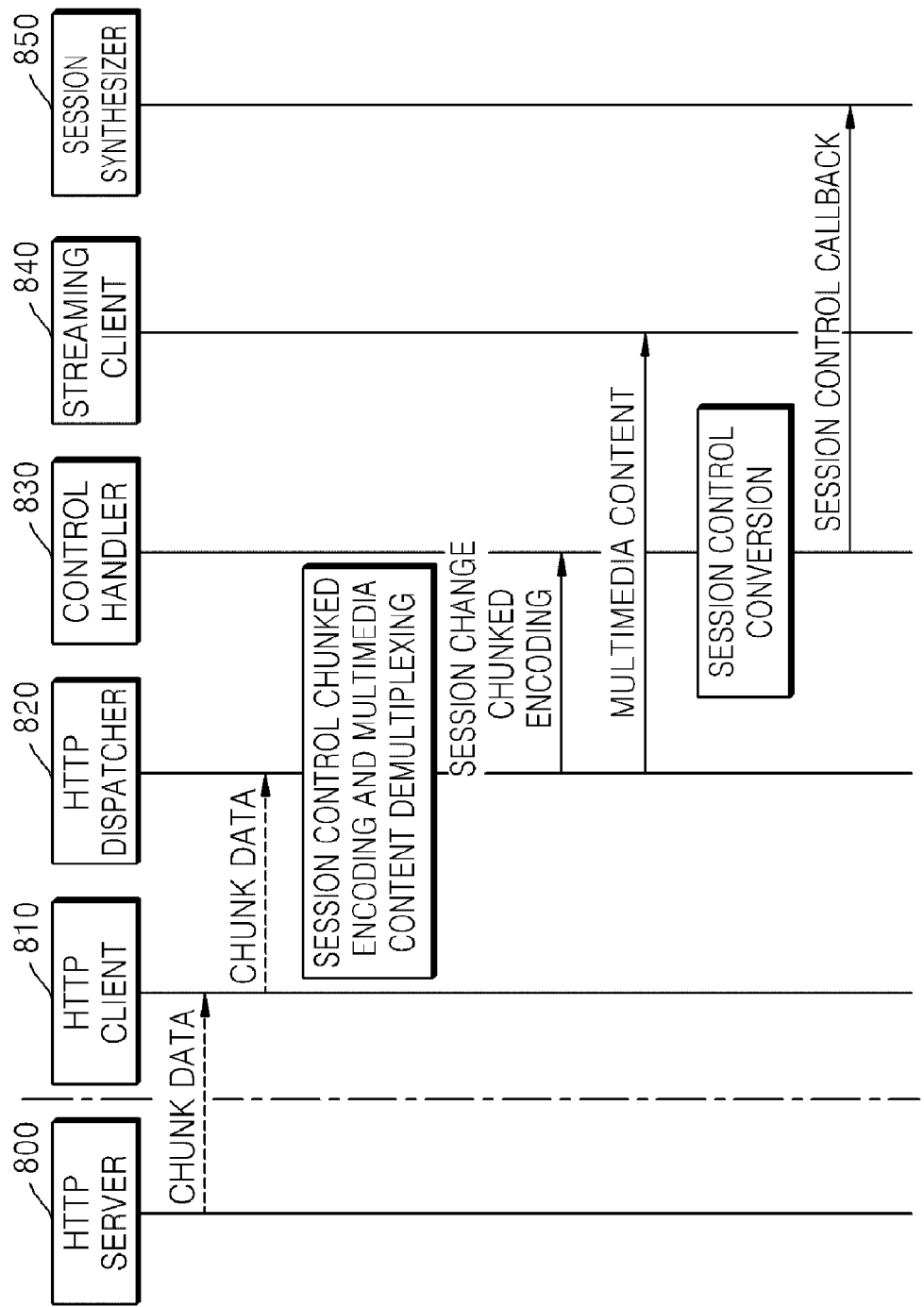
FIG. 8 is a signal flow diagram of a client for receiving a control request from a server to the client according to another exemplary embodiment of the present invention.

FIG. 8 is a signal flow diagram of a client for receiving a control request from a server to the client according to another exemplary embodiment of the present invention.

Referring to FIG. 8, similar to FIGS. 5 to 7, the left of a chain line represents the server, and the right thereof represents the client. In addition, dotted lines represent the streaming connection.

An HTTP client 810 receives chunk data from an HTTP server 800 through the streaming connection and transmits the chunk data to an HTTP dispatcher 820. Here, the chunk data is a multiplexed session control request and multiplexed content data.

The HTTP dispatcher 820 demultiplexes session change chunked encoding and multimedia content. In other words, the HTTP dispatcher 820 divides the chunk data into session control request information and multimedia content information. Next, the HTTP dispatcher 820 transmits the divided session control chunk-extension information to a control handler 830, and transmits the divided multimedia content data to a streaming client 840.

The control handler 830 converts the received session control chunked encoding. To do this, the control handler 830 converts the session control chunked encoding information into a control request message in a session level. Next, the control handler 830 calls callback of a session synthesizer 850 for the converted session control request.

Figure 9:
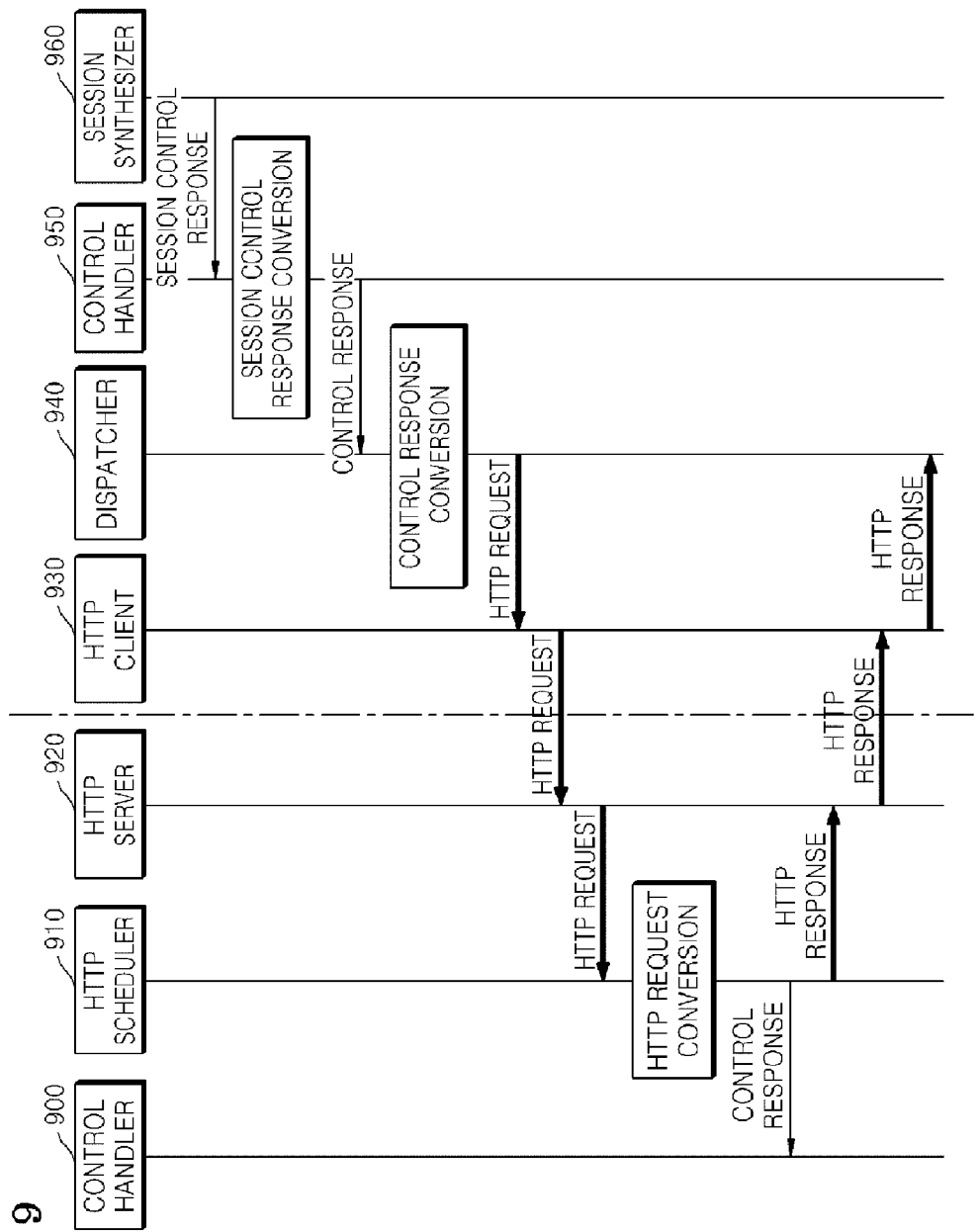
FIG. 9 is a signal flow diagram for explaining a response from a server to a client, to a control request according to another exemplary embodiment of the present invention.

FIG. 9 is a signal flow diagram for explaining a response from a server to a client, to a control request according to another exemplary embodiment of the present invention.

Referring to FIG. 9, similar to FIGS. 5 to 8, the left of a chain line represents the server, and the right thereof represents the client. In addition, thick lines represent the control connection.

After a session synthesizer 960 in the client processes a session control request from the server, the session synthesizer 960 transmits a response to the session control request to a control handler 950. The control handler 950 converts the received session control response. Here, the session control response is converted into a message in an HTTP level. Here, the session control response message includes a session ID and sequence information.

Thereafter, the control handler 950 transmits the converted response message in the HTTP level to an HTTP dispatcher 940. After the HTTP dispatcher 940 receives the converted response message, in order to transmit the received message through the control connection, the HTTP dispatcher 940 constructs a complete HTTP request message to an HTTP client 930 which manages the control connection. Here, the HTTP request message includes HTTP header information. In addition, the HTTP dispatcher 940 selects the HTTP client 930 which manages the control connection to transmit the HTTP request message through the control connection.

Here, the HTTP request message transmitted from the HTTP client 930 has a format as follows.

```
POST /path/to/url HTTP/1.1\r\n
HTTP headers\r\n
Content-Length=ddd\r\n
\r\n
type=sessioncontrolresponse
cmd=sessionstatus
sessionid=1234567\r\n
sequence=101\r\n
alive=true\r\n
rtt=...\r\n
...
```

As shown above, the response message has the format of the HTTP request message. However, the response message means a response message to the session control request from the server to the client. Although the response message means the session control response, the response message has the format of the HTTP request. Therefore, after this, a HTTP scheduler 910 transmits a dummy HTTP response message. Only when the aforementioned construction is satisfied, an HTTP rule is satisfied.

The HTTP client 930 transmits the converted HTTP request message to an HTTP server 920. The HTTP server 920 transmits the received message to the HTTP scheduler 910. The HTTP scheduler 910 analyzes the received HTTP request message, determines that the received HTTP request message is the session control response, and extracts only body information excluding an HTTP header.

Next, the HTTP scheduler 910 transmits control response information to a control handler 900 and transmits a dummy HTTP response to the received HTTP request message, to the HTTP server 920. The HTTP server 920 transmits the received dummy HTTP response message to the HTTP client 930. The HTTP client 930 transmits the received dummy HTTP response message to the dispatcher 940. The dispatcher 940 determines whether the received message is the dummy HTTP response, and when the received message is the dummy HTTP response, simply drops the dummy HTTP message.

Figure 10:
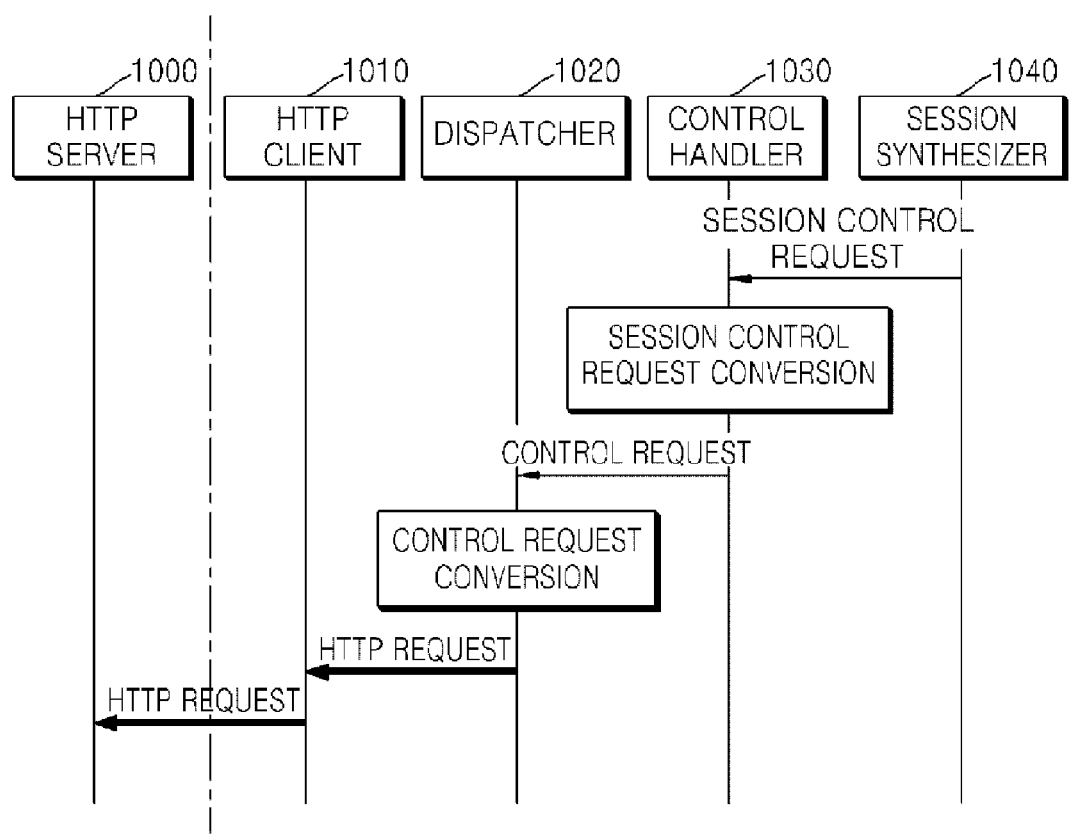
FIG. 10 is a signal flow diagram of a client for transmitting a control request from the client to a server according to another exemplary embodiment of the present invention.

FIG. 10 is a signal flow diagram of a client for transmitting a control request from the client to a server according to another exemplary embodiment of the present invention.

Referring to FIG. 10, similar to FIGS. 5 to 9, the left of a chain line represents the server, and the right thereof represents the client. In addition, thick lines represent the control connection.

When a session synthesizer 1040 needs session control, the session synthesizer 1040 requests an handler 1030 of a session control request. The control handler 1030 converts the session control request. To do this, the control handler 1030 converts a corresponding request to a control request in an HTTP level. In this case, the control request message in the HTTP level includes a session ID and sequence information. Nest, the control handler 1030 transmits the converted control request message to a dispatcher 1020.

The HTTP dispatcher 1020 converts the control request to a complete HTTP request message, and in order to transmit the HTTP request message through the control connection, selects an HTTP client 1010 which manages the control connection to transmit the HTTP request message to the HTTP client 1010. The HTTP client 1010 transmits the HTTP request message to the HTTP server 1000.

Here, the HTTP request message transmitted from the HTTP client 1010 has a format as follows.

```
POST /path/to/control HTTP/1.1\r\n
HTTP headers\r\n
Content-Length=ddd\r\n
\r\n
type=sessioncontrol\r\n
cmd=fastforward\r\n
sessionid=1234567\r\n
sequence=102\r\n
speed=x16\r\n
\r\n
```

Figure 11:
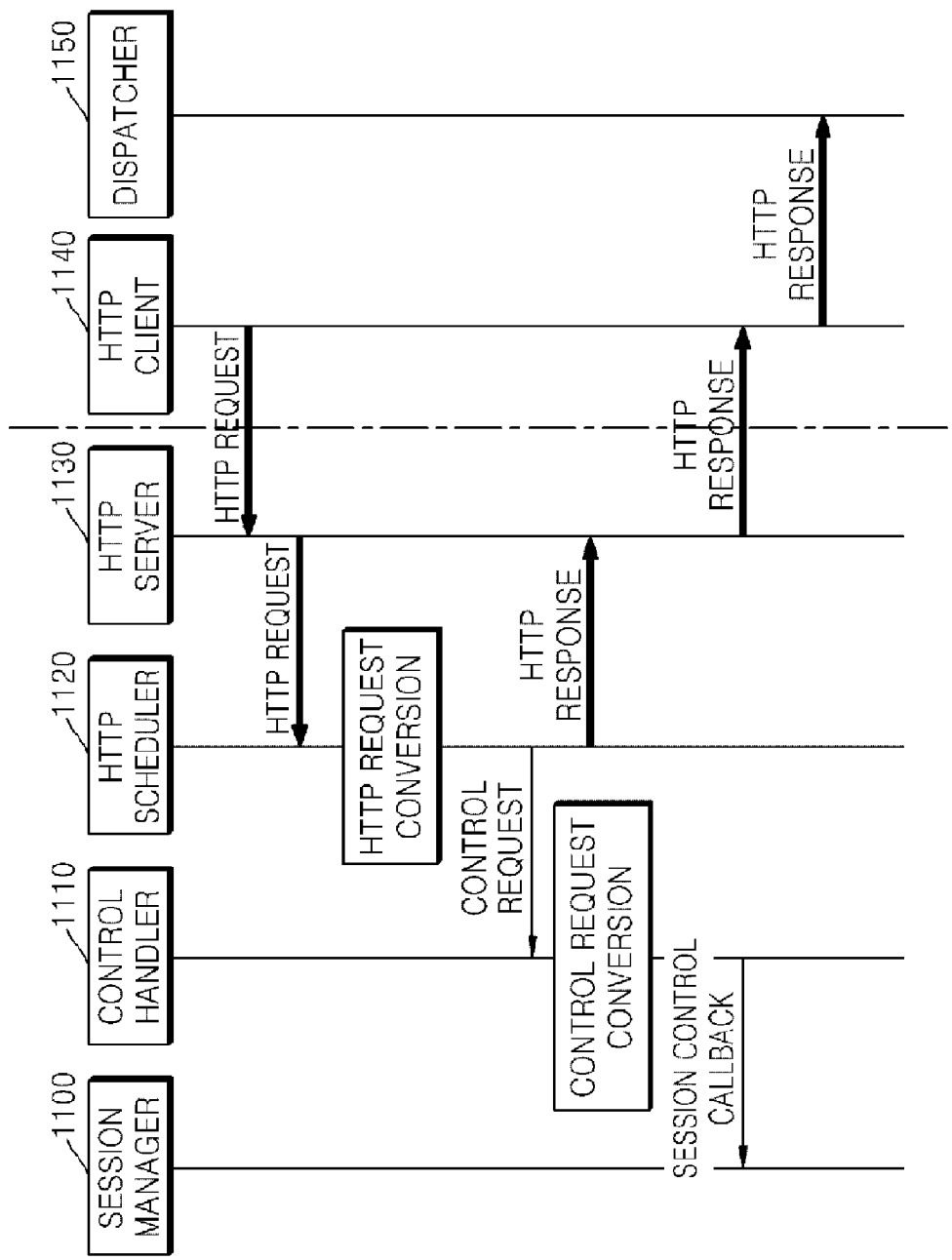
FIG. 11 is a signal flow diagram of a server for receiving a control request from a client to the server according to another exemplary embodiment of the present invention.

FIG. 11 is a signal flow diagram of a server for receiving a control request from a client to the server according to another exemplary embodiment of the present invention.

Referring to FIG. 11, similar to FIGS. 5 to 10, the left of a chain line represents the server, and the right thereof represents the client. In addition, thick lines represent the control connection.

An HTTP server 1130 receives an HTTP request from an HTTP client 1140. Here, the HTTP request message appears to be an HTTP request, however, in fact, means a session control request from the client to the server. The HTTP server 1130 transmits the HTTP request to an HTTP scheduler 1120.

The HTTP scheduler 1120 analyzes the HTTP request message, and determines that the received HTTP request message means session control, and extracts important control information excluding an HTTP header. The HTTP scheduler 1120 transmits the converted control request to a control handler 1110. In addition, the HTTP scheduler 1120 constructs a dummy HTTP response message and transmits the dummy HTTP response message to an HTTP server 1130.

The control handler 1110 which receives the control request from the HTTP scheduler 1120 converts the control request into a control message in a session level, calls callback of a corresponding session manager 1100, and calls a registered session control callback.

The HTTP server 1130 which receives the dummy HTTP response from the HTTP scheduler 1120 transmits the dummy HTTP response to an HTTP client 1140 through the control connection. The HTTP client 1140 transmits the dummy HTTP response to a dispatcher 1150. The dispatcher 1150 determines whether the received message is the dummy HTTP response, and when the received message is the dummy HTTP response, simply drops the dummy HTTP response.

Figure 12:
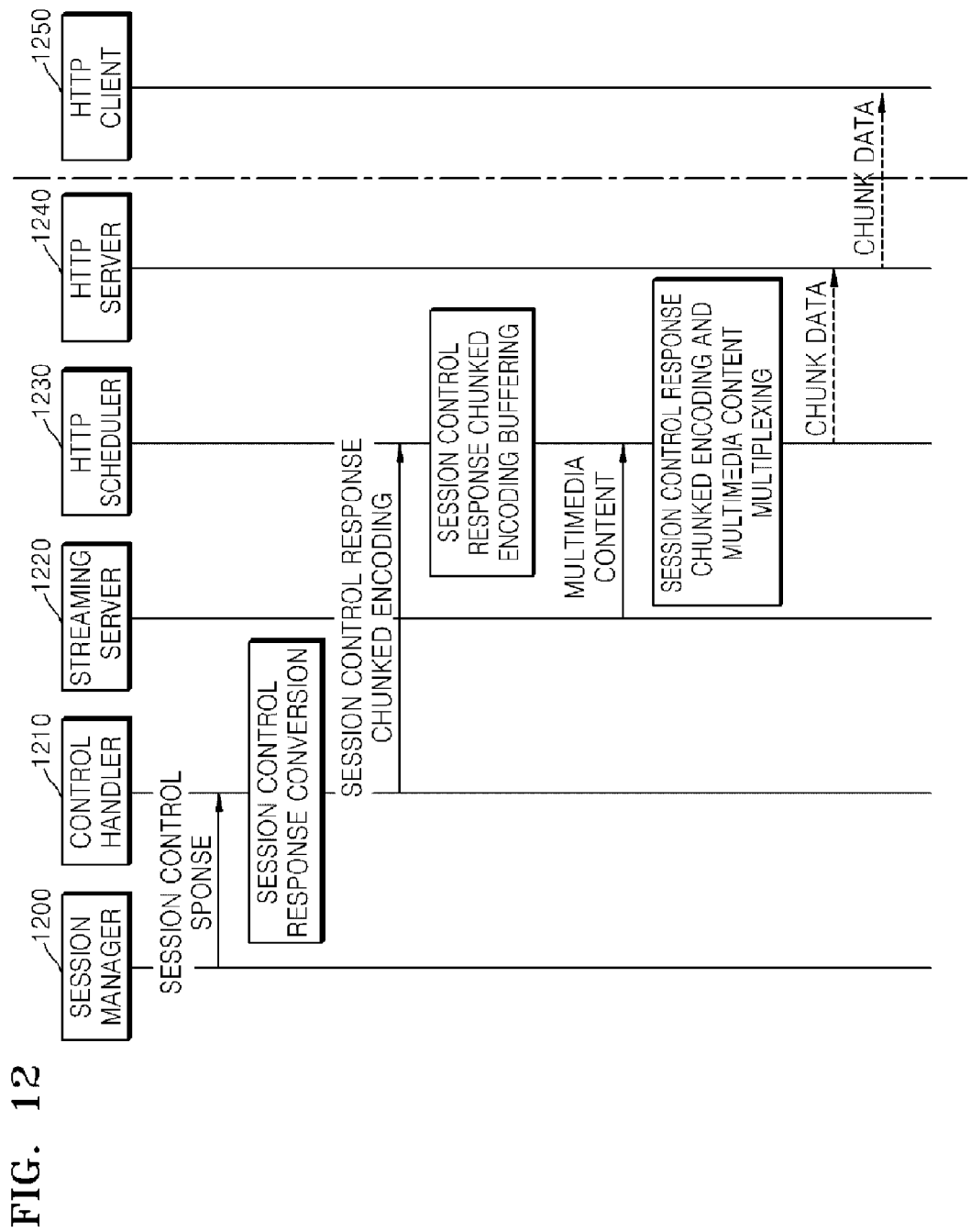
FIG. 12 is a signal flow diagram of a server for transmitting a response to a control request from a client to the server according to another exemplary embodiment of the present invention.

FIG. 12 is a signal flow diagram of a server for transmitting a response to a control request from a client to the server according to another exemplary embodiment of the present invention.

Referring to FIG. 12, similar to FIGS. 5 to 11, the left of a chain line represents the server, and the right thereof represents the client. In addition, dotted lines represent the streaming connection.

First, a session manager 1200 transmits a session response to a control handler 1210. More specifically, the session manager 1200 processes a session control request from the client to the server, and transmits a response message to the session control request to the control handler 1210. The control handler 1210 converts the session control response. More specifically, the control handler 1210 converts the session control response message in a session level into a message in a chunk-extension level. Here, a sessionid is added to a message ID.

Next, the control handler 1210 transmits the converted session control response chunked encoding to an HTTP scheduler 1230. The HTTP scheduler 1230 performs buffering on the session control response chunked encoding. Here, the HTTP scheduler 1230 checks whether current chunk transmission is being performed. When the current chunk transmission is being performed, the HTTP scheduler 1230 does not immediately transmit the session control response chunked encoding and performs buffering until a next chunk is transmitted. A streaming server 1220 transmits multimedia data to the HTTP scheduler 1230 to request the HTTP scheduler 1230 to transmit the multimedia data to the client. Next, the HTTP scheduler 1230 multiplexes the session control response chunked encoding transmitted from the control handler 1210 and the multimedia data transmitted from the streaming server 1220. More specifically, the HTTP scheduler 1230 multiplexes a session change notification message currently stacked in a buffer, a session control request message from the server to the client, a response message to a control request from the client to the server, and multimedia content data, into a chunk data message.

Next, the HTTP scheduler 1230 transmits the multiplexed chunk data through the streaming connection to an HTTP server 1240, and the HTTP server 1240 transmits the multiplexed chunk data to an HTTP client 1250. Here, a message format of the chunk data may be constructed as follows.

```
chunk-size;timestamp=1234568.0234;type=multiple;number of
msgs;start;type=sessioncontrolresponse;\cmd=
fastforwardresponse;\sessionid=1234567;sequence=102;speed=
x16;result=OK;end\r\n AV content-data......\r\n
```

The format of the chunk data is similar to the message format shown in FIG. 5. However, the format of the chunk data is different from the message format shown in FIG. 5 in that a type value of each individual message is "sessioncontrolresponse", and "cmd" means a type of a response. For example, other fields except for a fastforwardresponse-sessionid field and a sequence field can be different.

Figure 13:
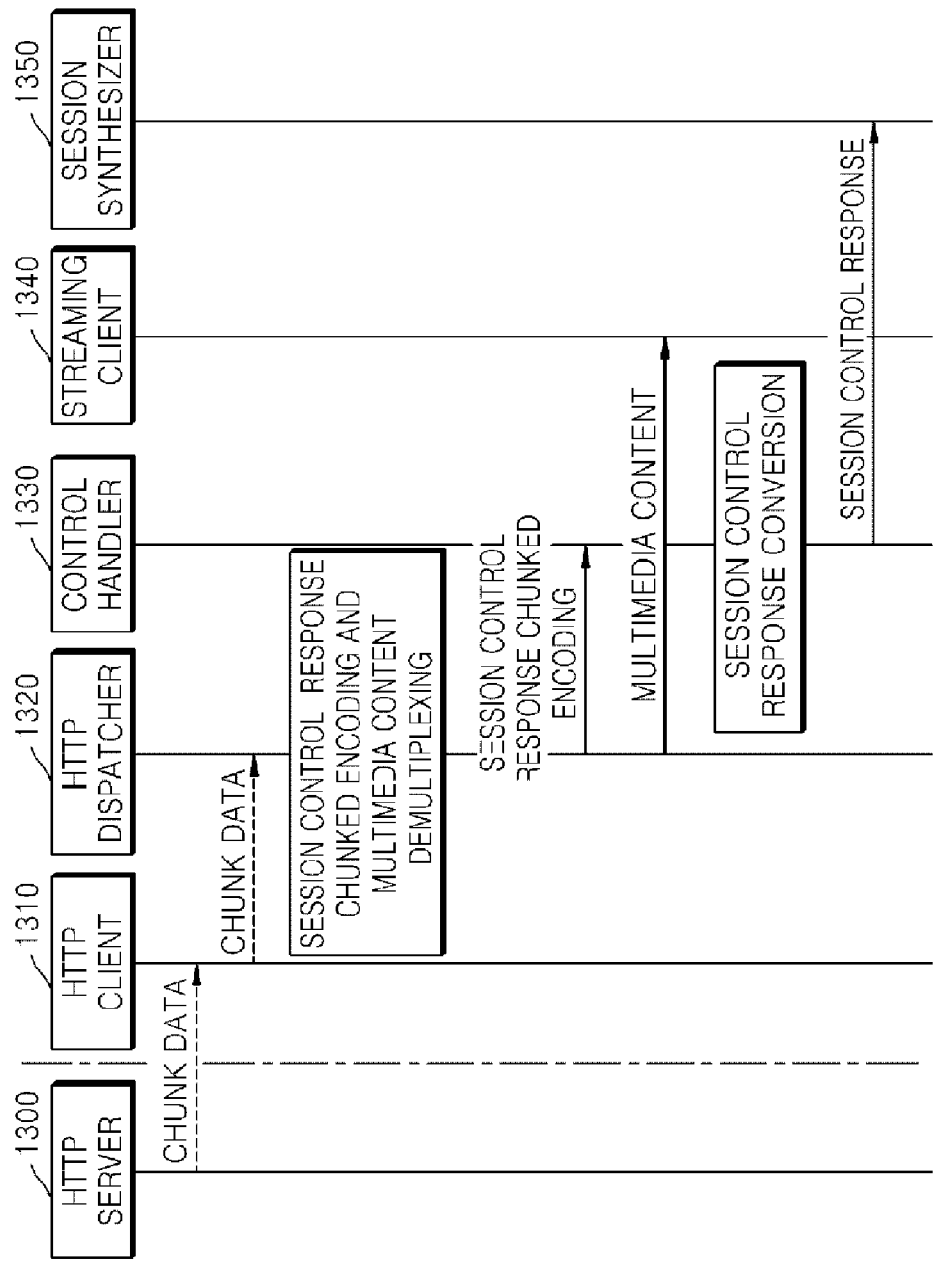
FIG. 13 is a signal flow diagram of a client for receiving a response to a control request from the client to a server according to another exemplary embodiment of the present invention.

FIG. 13 is a signal flow diagram of a client for receiving a response to a control request from the client to a server according to another exemplary embodiment of the present invention.

Referring to FIG. 13, similar to FIGS. 5 to 12, the left of a chain line represents the server, and the right thereof represents the client. In addition, dotted lines represent the streaming connection.

An HTTP client 1310 which receives chunk data from an HTTP server 1300 through the streaming connection transmits the chunk data to an HTTP dispatcher 1320. Here, the chunk data is multiplexed session control response information and multiplexed multimedia content data.

The HTTP dispatcher 1320 demultiplexes session control response chunked encoding and the multimedia content. More specifically, the HTTP dispatcher 1320 divides the chunk data into session control response information and multimedia content information. Next, the HTTP dispatcher 1320 transmits the divided session control response chunk-extension information to a control handler 1330, and transmits the divided multimedia content data to a streaming client 1340.

The control handler 1330 converts the received session control response chunked encoding. More specifically, the control handler 1330 converts the session control response chunked encoding information to a control response message in a session level. Next, the control handler 1330 transmits the converted session control response message to a session synthesizer 1350.

Accordingly, bidirectional communication between a client and a server is possible by using HTTP without modifying an existing HTTP protocol, so that there is an advantage in that real-time transmission can be implemented.

In addition, a problem which occurs during real-time streaming using HTTP is solved, so that it is possible to apply the HTTP to the real-time streaming.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in format and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A communication method using hypertext transfer protocol (HTTP), the method comprising:

setting a streaming connection and a control connection between a client and a server;

transmitting an HTTP streaming request from the client to the server;

at the server, constructing a chunked encoding for the HTTP streaming request, and transmitting a first chunk response to the client through the streaming connection, wherein the first chunk response comprises the chunked encoding; and transmitting a second chunk response from the server to the client through the streaming connection, wherein the second chunk response comprises a notification of the server, wherein the notification of the server includes one of a session control message and a session change request message.

2. The method of claim 1, further comprising transmitting, from the server, a third chunk response to the client through the streaming connection;

wherein the third chunk response comprises a query of a state of the client.

3. The method of claim 2, further comprising:

transmitting an HTTP post request from the client to the server through the control connection;

wherein the HTTP post request comprises a response to the query of the state of the client; and transmitting a dummy HTTP response from the server to the client through the control connection, in response to the HTTP post request.

4. The method of claim 1, further comprising:

transmitting an HTTP post request from the client to the server through the control connection;

wherein the HTTP post request comprises a control request; and transmitting a dummy HTTP response from the server to the client through the control connection, in response to the HTTP post response.

5. The method of claim 4, further comprising transmitting, from the server, a fourth chunk response to the client through the streaming connection;

wherein the fourth chunk response comprises a response to the control request.

6. The method of claim 1, wherein, when the first or second chunk response is transmitted, timestamping is performed on each of the chunks using chunk-extension.

7. A non-transitory computer-readable medium having embodied thereon a computer program for performing the method of claim 1.

8. A communication apparatus using hypertext transfer protocol (HTTP), the apparatus comprising:

a server which is connected with a client through a streaming connection and a control connection;

wherein the server receives an HTTP streaming request from the client through the streaming connection, constructs chunked encoding for the HTTP streaming request and transmits a first chunk response to the client through the streaming connection, and transmits a second chunk response to the client through the streaming connection;

wherein the first chunk response comprises the chunked encoding, and the second chunk response comprises a notification of the server, wherein the notification of the server includes one of a session control message and a session change request message.

9. The communication apparatus of claim 8, wherein the server transmits a third chunk response to the client through the streaming connection, and wherein the third chunk response comprises a query of a state of the client.

10. The communication apparatus of claim 9, wherein the server transmits a dummy HTTP response to an HTTP post request to the client through the control connection, and wherein the HTTP post request comprises a response to the query of a state of the client or a control request from the client.

11. The communication apparatus of claim 8, wherein the server transmits the fourth chunk response to the client through the streaming connection, and wherein the fourth chunk response comprises a response to the control request from the client in a fourth chunk response.

* * * * *